June 14, 1966     R. L. BOYLES     3,255,637
SEAL FOR ELECTRIC TOOTHBRUSHING DEVICE
Filed April 2, 1964     2 Sheets-Sheet 1

INVENTOR
BY Robert L. Boyles.
HIS ATTORNEY

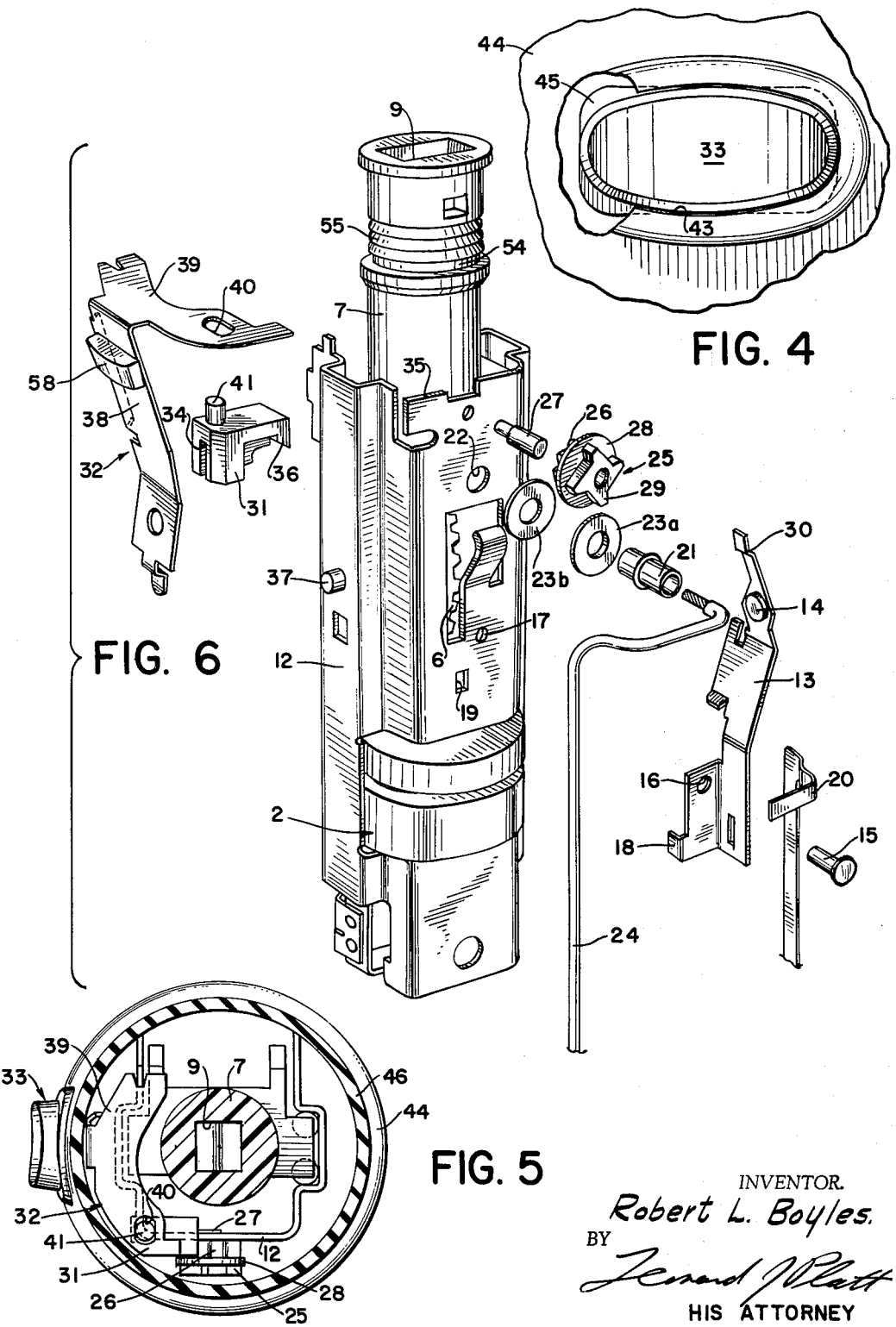

United States Patent Office 3,255,637
Patented June 14, 1966

3,255,637
SEAL FOR ELECTRIC TOOTHBRUSHING DEVICE
Robert L. Boyles, Wayland, Mass., assignor to General Electric Company, a corporation of New York
Filed Apr. 2, 1964, Ser. No. 356,821
4 Claims. (Cl. 74—17.8)

My invention relates to electric toothbrushing devices, and particularly to an arrangement providing a seal for the casing of the device.

The present manufacturers of electric toothbrushing devices have been faced with the problem of blocking the entrance of fluids and foreign matter into the casing for the device, and especially in preventing fluids from fouling the switch and motor for the device. The problem is especially acute in the region of the reciprocable brush holder for the device because of the natural tendency of water and other foreign matter to travel down the stem of the brushing implement and over the brush holder during and after the use of the device. The water and foreign matter inevitably enter the casing, passing through and around the brush holder bearings at the forward end of the casing. Prior art devices have, for the most part, utilized only the unsatisfactory sealing effect between the holder and the holder bearing surfaces to block the passage of these fluids into the casing. At least one prior art device illustrates an attempt to solve this problem by disposing a diaphragm around the holder within the casing. However, this arrangement presents an unsanitary condition because the fluids which have passed into the casing will collect in the pocket formed between the outside of the diaphragm and the inner surface of the casing. It has been the practice to seal the switch with a cover or girdle fitted in the casing wall. This arrangement has the disadvantage of hiding the switch operator, thus making actuation less convenient for the user. Also, the additional expense of providing separate sealing structure for the switch apart from that used in attempting to seal the brush holder is necessitated.

My invention obviates these difficulties by providing a simple sealing boot at the forward end of the casing functioning dually to seal the holder and also the switch. My invention also eliminates the need for a tapered nose at the forward end of the casing, thus enabling all internal parts of the toothbrush device to be assembled and then inserted into the forward end of the casing in a highly simplified assembly operation.

It is an object of my invention to provide a combination seal for the brush holder and switch of an electric toothbrushing device.

It is another object of my invention to provide a switch for an electric toothbrushing device which is waterproof and easily operable by a convenient button located on the outside of the casing.

It is a further object of my invention to provide an inexpensive and highly efficient seal around the brush holder of an electric toothbrush.

It is still another object of my invention to provide an electric toothbrush construction which can be easily and economically assembled through the forward end of the toothbrush casing.

Further objects and advantages of my invention will become apparent as the following description proceeds. The features of novelty which characterize my invention will be pointed out with particularity in the claims annexed to and forming a part of this specification.

In carrying out the objects of my invention, in one form thereof, a frusto-conical sealing boot is provided at one open end of a cylindrical casing of an electric toothbrushing device. The larger end portion of the frusto-conical boot is sealed around the open end of the casing. The smaller end of the boot has an axial, inwardly directed tubular extension disposed in sealing engagement with the brush holder for the device. The afore-described seal of the larger end of the boot around the open end of the casing is accomplished by a clamping ring. The ring has an aperture which loosely receives a push-button operator for a pawl-and-ratchet switch for the device located adjacent the open end of the casing. The push button is mounted so as to deform the resilient boot inwardly to actuate the switch. It can be seen then that with my boot a simple and inexpensive sealing of both the brush holder and the switch mechanism is provided.

For a better understanding of my invention, reference may be made to the accompanying drawings in which:

FIG. 4 is a view, partly broken away, of the push-button switch operator.

FIG. 5 is a view taken along the line 5—5 in FIG. 2.

FIG. 6 is an exploded view of the switch and switch actuating arrangement.

Figure 1:
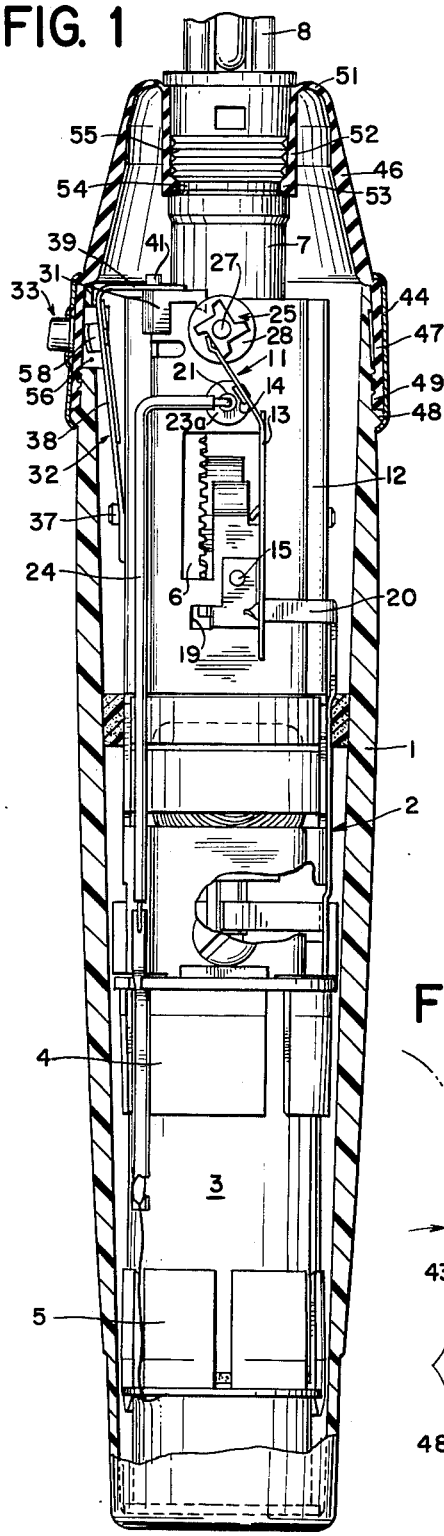
FIG. 1 is a sectional view, partly broken away, of my electric toothbrushing device.
Figure 2:
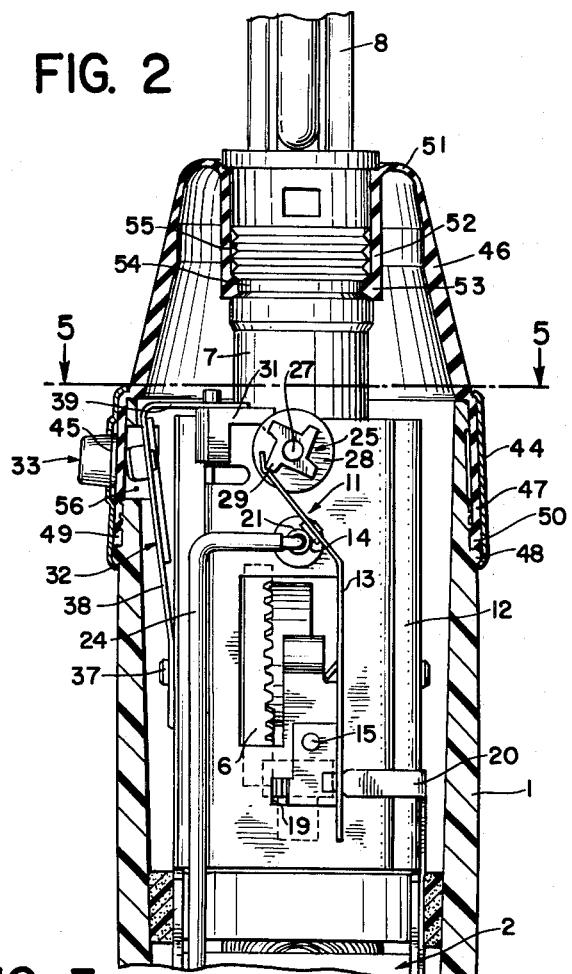
FIG. 2 is an enlarged view of a portion of FIG. 1, showing the upper region of the interior of the toothbrushing device.

Referring to the drawings, particularly FIGS. 1 and 2, it will be seen that the operating components of my toothbrushing device are assembled within an open-ended casing 1. Located centrally within the interior of the casing is a motor 2 energized by a battery 3 retained within battery holders 4, 5. A face gear 6 forms a part of a molten translating mechanism serving to convert the rotary motion of the motor 2 into reciprocatory motion of a brush holder 7. Brush holder 7 projects through the open end of the casing 1 with socket 9 being in position to receive the stem of a brushing implement, a portion of which is shown at 8.

Referring to FIGS. 2, 3, 5, and 6, a ratchet-and-pawl switch 11 is mounted adjacent the open end of the casing 1 upon a wall of an inner housing 12. The switch 11 comprises a movable contact blade 13 mounting a contact 14. The contact blade 13 is secured upon the housing 12 by a rivet 15 penetrating aperture 16 in the blade 13 and aperture 17 in the housing 12. The blade 13 is prevented from rotating about rivet 15 by a projection 18 penetrating an opening 19 in the housing 12. Conductor 20 electrically connects the blade 13 with the motor 2.

A fixed contact 21 cooperating with the movable contact 14 is anchored within an aperture 22 in the inner housing 12 and insulated from the housing by insulating washers 23a, 23b disposed on opposed sides of the housing wall. Lead 24 connects the fixed contact 21 with a terminal of the battery 3.

The contact blade 13 is actuated by a four-lobed cam 25 mounted coaxially with an eight-toothed ratchet wheel 26 upon a pin 27. Ratchet wheel 26 is spaced from the cam 25 by a circular disc 28. It will be evident from the drawings that the lobes 29 of the cam 25 consecutively engage and release the tip 30 of contact blade 13. The tip 30 is bent inwardly toward the center of the cam 25 so as to be between the cam lobes 29 in position to abut the back of a cam lobe 29 should the cam 25 begin to rotate in the reverse direction.

The switch is actuated by a switch actuating arrangement which comprises, briefly, a pawl 31, an actuator 32, and a switch operator 33. These elements cooperate to drive the ratchet wheel 26, and hence the cam 25, to make and break contacts 14 and 21. In more detail, the pawl 31 is provided with a longitudinal groove 34 which receives a guiding and supporting upper edge 35 of the inner housing 12. The pawl 31 is reciprocated upon the upper edge 35 of the inner housing 12 to bring a nose 36 of the pawl 31 into engagement with the teeth of the ratchet wheel 26.

The pawl 31 is moved by the actuator 32, which is located on the inner housing 12 by a pin 37. The actuator includes a resilient arm 38 which supports an integral head 39 bent at an angle with respect to the arm 38. Head 39 is provided with an aperture 40 which receives a projection 41 upstanding from the top of pawl 31. It can be seen that a deflection of arm 38 of the actuator 32 moves pawl 31 into driving engagement with the teeth on ratchet wheel 26 and causes rotation of the pawl 31. Each reciprocation of the pawl turns the ratchet wheel 26 through one-eighth of a revolution. This angular displacement is sufficient to rotate a lobe 29 of cam 25 into or out of engagement with contact blade 13, and to thus move the contact 14 into or out of engagement with the fixed contact 26. It is evident then that a full revolution of the ratchet wheel 26 will cause the switch 11 to be closed and opened four times.

Figure 3:
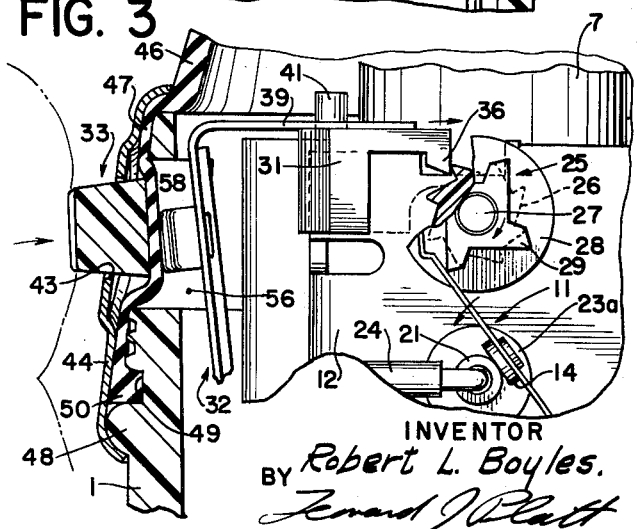
FIG. 3 is a close-up view of the switch and switch actuating arrangement.

A switch operator 33 in the form of a push button is provided to deflect actuator 38. The switch operator 33 is loosely retained in an opening 43 in a clamping ring 44. This arrangement is best shown in FIGS. 3 and 4. A flange 45 at the base of the push-button operator 33 extends beyond the boundary of opening 43 and thus serves to retain the operator 33 in the opening 43.

It is manifest then that a depression of the push-button operator 33 deflects actuator arm 38. This deflection slides pawl 31 on the upper edge 35 of the inner housing 12, bringing the nose 36 of the pawl 31 into engagement with the teeth of ratchet wheel 26 and thus causing the actuation of the switch 11.

In order to perform the dual function of preventing fluid from entering the casing around the open end of the casing and also from gaining access in the area of the brush holder, boot 46 is provided. Referring again to FIGS. 1, 2, and 3, the boot 46 is generally frustro-conical in shape, having a first end portion 47 surrounding the open end of casing 1. This first end portion is urged into tight sealing engagement with the outer surface of casing 1 by the clamping ring 44. Clamping ring 44 engages an annular lug 48 on the casing 1 to secure the ring 44 tightly in place. A groove 49 around the periphery of the casing 1 receives a lip 50 on the termination of the first end portion to improve the sealing effectiveness of the boot 46.

A convergent or second end portion 51 of the boot 46 is formed of reduced thickness in order that the presence of the boot 46 will not impede the reciprocation of brush holder 7. The second end portion 51 has an axial, inwardly directed tubular extension 52 which surrounds the brush holder 7 in sealing engagement therewith. An annular lip 53 at the termination of the tubular extension 52 received in an annular groove 54 in brush holder 7 improves the sealing effect between the tubular extension 52 and the brush holder 7. Ribs 55 on brush holder 7 act to prevent axial displacement of the extension 52 during reciprocation of the brush holder 7.

It will be evident that push-button operator 33, received in opening 43 in clamping ring 44, is isolated and sealed from the interior of the casing 1 by the first end portion 47 of boot 46. The operator 33 is disposed in contact with the outside surface of the first end portion 47 of the boot 46. Stud 58 on actuator arm 38 projects through an aperture 56, 57 in the casing 1 into engagement with the inner surface of first end portion 47. A depression of operator 33 deforms the first end portion 47 against stud 58, thus deflecting the actuator arm 38 and actuating the switch 11.

My invention is not limited to the particular details of construction of the embodiment illustrated and I contemplate that various and other modifications and applications will occur to those skilled in the art. It is therefore my intention that the appended claims shall cover such modifications and applications as do not depart from the true spirit and scope of my invention.

What I claim as new and desire to secure by Letters Patent of the United States is:

1. An electric toothbrushing device comprising:
   (a) a casing having and opening at the forward end thereof,
   (b) a brush holder projecting through said opening in said casing,
   (c) a switch disposed within said casing adjacent said opening,
   (d) a switch operator mounted externally of said casing, and
   (e) a resilient boot for precluding the passage of fluids into said casing,
   (f) said boot having a first end portion in sealing engagement with the outer surface of said casing and a second end portion in sealing engagement with said brush holder,
   (g) said boot isolating said switch operator from the interior of said casing and being deformable by said switch operator to actuate said switch.

2. The combination of claim 1 wherein a clamping ring is positioned adjacent said first end portion of said boot for urging said first end portion into sealing engagement with said outer surface of said casin, said ring has an aperture loosely receiving said switch operator, and said ring supports said operator for deforming engagement with the outer surface of said boot.

3. The combination of claim 1 wherein said boot is frustro-conical in shape, said second end portion of said boot having an axial, inwardly directed tubular extension disposed in sealing engagement with said brush holder.

4. An electric toothbrushing device comprising:
   (a) a casing having an opening at the forward end thereof,
   (b) a brush holder projecting through said opening in said casing,
   (c) a switch disposed within said casing adjacent said opening,
   (d) a push-button switch operator mounted externally of said casing,
   (e) said operator having a flange at the base thereof,
   (f) a frustro-conical, flexible boot for precluding the passage of fluids into said casing having its larger end secured in sealing engagement with the outer surface of said casin,
   (g) said boot isolating said switch operator from the interior of said casing, and
   (h) a clamping ring for holding said larger end of said boot in sealing engagement with said casing, said ring having an aperture receiving said operator, the portion of said ring surrounding said aperture engaging said flange to hold said operator in position,
   (i) said clamping ring supporting and positioning said operator for deforming said boot to actuate said switch,
   (j) the convergent end of said boot having an axial, inwardly directed tubular extension disposed in sealing engagement with said brush holder.

References Cited by the Examiner
UNITED STATES PATENTS

| | | | |
|---|---|---|---|
| 2,648,787 | 8/1953 | Smithson | 15—22 X |
| 3,133,297 | 5/1964 | Gerber et al. | 15—22 |
| 3,135,881 | 6/1964 | Fresard | 15—22 X |
| 3,142,852 | 8/1964 | Phaneuf et al. | 15—22 |

CHARLES A. WILLMUTH, *Primary Examiner.*

EDWARD L. ROBERTS, *Assistant Examiner.*